(12) United States Patent
Choo et al.

(10) Patent No.: US 10,622,599 B2
(45) Date of Patent: *Apr. 14, 2020

(54) BATTERY MODULE OF EXCELLENT STRUCTURAL STABILITY

(71) Applicant: LG CHEM, LTD., Seoul (KR)

(72) Inventors: YeonSeok Choo, Daejeon (KR); Jin Kyu Lee, Daejeon (KR); Jung Min Park, Daejeon (KR); Ye Hoon Im, Daejeon (KR); Hyun Chul Park, Chungcheongnam-do (KR)

(73) Assignee: LG CHEM, LTD., Seoul (KR)

( * ) Notice: Subject to any disclaimer, the term of this patent is extended or adjusted under 35 U.S.C. 154(b) by 336 days.

This patent is subject to a terminal disclaimer.

(21) Appl. No.: 14/036,363

(22) Filed: Sep. 25, 2013

(65) Prior Publication Data

US 2014/0093770 A1 Apr. 3, 2014

Related U.S. Application Data

(63) Continuation of application No. 13/878,723, filed as application No. PCT/KR2011/008270 on Nov. 2, 2011, now Pat. No. 8,808,893.

(30) Foreign Application Priority Data

Nov. 15, 2010 (KR) .................. 10-2010-0113275

(51) Int. Cl.
*H01M 2/10* (2006.01)
*H01M 2/20* (2006.01)

(52) U.S. Cl.
CPC ....... *H01M 2/1077* (2013.01); *H01M 2/1083* (2013.01); *H01M 2/206* (2013.01); *H01M 2220/20* (2013.01)

(58) Field of Classification Search
CPC .......... H01M 2220/20; H01M 2/1077; H01M 2/1083; H01M 2/206
See application file for complete search history.

(56) References Cited

U.S. PATENT DOCUMENTS

| | | | |
|---|---|---|---|
| 6,451,475 B1 * | 9/2002 | Sherwood | H01M 2/1077 429/100 |
| 2010/0255363 A1 * | 10/2010 | Yoon | H01M 2/1077 429/156 |
| 2012/0216480 A1 * | 8/2012 | Darr, III | E04B 2/7457 52/653.1 |

FOREIGN PATENT DOCUMENTS

| | | |
|---|---|---|
| JP | 2000-195504 A | 7/2000 |
| JP | 2001-236937 A | 8/2001 |

(Continued)

*Primary Examiner* — Lingwen R Zeng
(74) *Attorney, Agent, or Firm* — Dentons US LLP

(57) ABSTRACT

A battery module having secondary batteries or unit modules, each having two or more secondary batteries, stacked vertically, wherein the battery module includes a base plate on which the secondary batteries or the unit modules are stacked, a pair of end plates disposed in contact with outer sides of the secondary batteries or the unit modules in which the bottom of each of the end plates is fixed to the base plate, and supporting bars connected between opposite sides of the end plates. The base plate is provided at opposite sides thereof with a pair of upward protrusions extending in a longitudinal direction to prevent deformation due to vertical vibration and to disperse pressure. Opposite sides of the bottom of each of the unit modules are disposed at the top of the upward protrusions.

5 Claims, 4 Drawing Sheets

(56) References Cited

FOREIGN PATENT DOCUMENTS

| | | |
|---|---|---|
| JP | 2001-283938 A | 10/2001 |
| JP | 2002-141036 | 5/2002 |
| JP | 2002-343324 | 11/2002 |
| JP | 2002-3433324 A | 11/2002 |
| JP | 2005-149837 A | 6/2005 |
| JP | 2006-040753 | 2/2006 |
| JP | 2008-311012 A | 12/2008 |
| JP | 2009-527077 A | 7/2009 |
| KR | 10-2006-0085775 | 7/2006 |
| KR | 10-2007-0080861 | 8/2007 |
| KR | 10-2007-0081584 | 8/2007 |
| KR | 10-2007-0091387 | 9/2007 |
| KR | 10-2007-0112490 | 11/2007 |
| WO | 2009-002096 A1 | 12/2008 |
| WO | 2010-071292 A1 | 6/2010 |

\* cited by examiner

BATTERY MODULE OF EXCELLENT STRUCTURAL STABILITY

This application is a continuation of Ser. No. 13/878,723, filed Apr. 10, 2013, which is a National Stage Entry of International Application No. PCT/KR2011/008270, filed Nov. 2, 2011, and claims the benefit of Korean Patent Application No. 10-2010-0113275, filed on Nov. 15, 2010, all of which are hereby incorporated by reference in their entirety for all purposes as if fully set forth herein.

TECHNICAL FIELD

The present invention relates to a battery module of excellent structural stability, and, more particularly, to a middle or large-sized battery module having unit modules, each of which has secondary batteries mounted therein, stacked in a state in which the unit modules are erected vertically, the battery module including a base plate on which the secondary batteries or the unit modules are stacked in a vertically erected state, a pair of end plates disposed in tight contact with outer sides of the outermost unit modules or the outermost unit modules in a state in which the bottom of each of the end plates is fixed to the base plate, and supporting bars connected between opposite sides of upper parts or side parts of the end plates so as to interconnect and support the end plates, wherein the base plate is provided at opposite sides thereof with a pair of upward protrusions extending in a longitudinal direction of the base plate to prevent the base plate from being deformed due to vertical vibration and to disperse pressure (load), and opposite sides of the bottom of each of the unit modules are disposed at the top of the upward protrusions.

BACKGROUND ART

One of the biggest problems caused from vehicles using fossil fuel, such as gasoline and diesel oil, is the creation of air pollution. A technology of using a secondary battery, which can be charged and discharged, as a power source for vehicles has attracted considerable attention as one method of solving the above-mentioned problem. As a result, electric vehicles (EV), which are operated using only a battery, and hybrid electric vehicles (HEV), which jointly use a battery and a conventional engine, have been developed. Some of the electric vehicles and the hybrid electric vehicles are now being commercially used. A nickel-metal hydride (Ni-MH) secondary battery has been mainly used as the power source for the electric vehicles (EV) and the hybrid electric vehicles (HEV). In recent years, however, the use of a lithium-ion secondary battery has been attempted.

High power and large capacity are needed for such a secondary battery to be used as the power source for the electric vehicles (EV) and the hybrid electric vehicles (HEV). To this end, a plurality of small-sized secondary batteries (unit cells) is connected in series to each other so as to form a battery module. According to circumstances, the small-sized secondary batteries (unit cells) are connected in series and in parallel to each other so as to form a battery module.

Generally, such a battery module has a structure to protect unit modules, each of which has secondary batteries mounted therein. The structure of the battery module may be various based on the kind of vehicles or installation position of the battery module in the vehicles. One of the structures to effectively fix large-capacity unit modules is based on supporting bars and end plates as shown in FIG. 1.

Referring to FIG. 1, a battery module 100 includes unit modules 10, each of which has secondary batteries mounted therein, a base plate 20, a pair of end plates 30, and supporting bars 40.

The unit modules 10 are stacked at the top of the base plate 20 in a state in which the unit modules 10 are erected vertically. The end plates 30 are disposed in tight contact with the outer sides of the outermost unit modules 10 in a state in which the bottom of each of the end plates 30 is fixed to the base plate 20.

The supporting bars 40 are connected between the upper parts of the end plates 30 so as to interconnect and support the end plates 30.

In the structure in which the unit modules 10 are stacked at the top of the plate-shaped base plate 20 in a tight contact fashion, however, strength of the base plate 20 is low with respect to motion in the direction perpendicular to the base plate 20, i.e. the vertical direction. If the base plate 20 does not have vertical strength, the base plate, the base plate 20 may be greatly deformed due to vertical vibration.

Also, in a case in which the battery module is installed in a trunk of a vehicle, a portion of the base plate is mounted above a region where a spare tire is located due to the layout of the vehicle. That is, the battery module is installed in an asymmetrical structure. If vibration from the vehicle due to a road surface is severe, twisting load is applied to the battery module, and such twisting load is transmitted to the base plate with the result that the base plate may be easily damaged.

Therefore, there is a high necessity for a vertical stack type battery module having a structure to stably maintain the stacked structure of the unit modules and to effectively offsetting vertical vibration and properly disperse bending load even when pressure generated from the unit modules are applied to the base plate.

DISCLOSURE

Technical Problem

Therefore, the present invention has been made to solve the above problems, and other technical problems that have yet to be resolved.

Specifically, it is an object of the present invention to provide a battery module configured to have a structure in which a base plate, at which unit modules are mounted, is provided with an upward protrusion of a specific structure to stably support the unit modules.

Technical Solution

In accordance with one aspect of the present invention, the above and other objects can be accomplished by the provision of a middle or large-sized battery module having secondary batteries or unit modules, each of which has two or more secondary batteries mounted therein, stacked in a state in which the secondary batteries or the unit modules are erected vertically, the battery module including a base plate on which the secondary batteries or the unit modules are stacked in a vertically erected state, a pair of end plates disposed in tight contact with outer sides of the outermost unit modules or the outermost unit modules in a state in which the bottom of each of the end plates is fixed to the base plate, and supporting bars connected between opposite sides of upper parts or side parts of the end plates so as to interconnect and support the end plates, wherein the base plate is provided at opposite sides thereof with a pair of upward protrusions extending in a longitudinal direction of the base plate to prevent the base plate from being deformed due to vertical vibration and to disperse pressure (load), and opposite sides of the bottom of each of the unit modules are disposed at the top of the upward protrusions.

In the battery module according to the present invention, therefore, the upper protrusions are formed at the opposite sides of the top of the base plate so that the upper protrusions extend in the longitudinal direction of the base plate, thereby preventing the battery module from being deformed due to vertical vibration applied to the battery module and improving mechanical strength of the battery module.

In the present invention, each of the unit modules may be a secondary battery or a small-sized module having two or more secondary batteries mounted therein. An example of a unit module having two or more secondary batteries mounted therein is disclosed in Korean Patent Application No. 2006-12303, which has been filed in the name of the applicant of the present application. In the disclosure of this patent application, the unit module is configured to have a structure in which two secondary batteries are mounted to a frame member having input and output terminals in a state in which the secondary batteries are in tight contact with each other.

Another example of the unit module is disclosed in Korean Patent Application No. 2006-20772 and No. 2006-45444, which have also been filed in the name of the applicant of the present application. In the disclosure of each of these patent applications, the unit module is configured to have a structure in which outer sides of two secondary batteries are covered with a pair of high-strength cell covers in a state in which the secondary batteries are in tight contact with each other.

The disclosures of the above patent applications are incorporated herein by reference. Of course, however, the structure of each of the unit modules of the battery module according to the present invention is not limited to the above examples of the unit modules disclosed in the above patent applications.

In a concrete example, each of the upper protrusions may include an upper side part, with which the bottom of each of the secondary batteries or the unit modules comes into contact, and an inner side part and an outer side part vertically connected between the upper side part and a main body of the base plate.

That is, each of the upper protrusions includes an upper side part to support the unit modules when the unit modules are vertically stacked and an inner side part and an outer side part vertically connected between the upper side part and the base plate. Consequently, it is possible for the upper protrusions to greatly offset vibration generated in the direction perpendicular to the base plate. Also, the upper protrusions are configured to have a shape corresponding to the inner bottom of a vehicle frame constituting a framework of a vehicle. When the battery module is installed in the vehicle, therefore, stability of the battery module is further improved.

In connection with this case, the inventors of the present invention have found that, if a width x of the upper side part of each of the upper protrusions is not optimized although the upper protrusions are formed at the base plate, it is not possible to sufficiently secure strength of the battery module.

For reference, FIG. 6 is a graph showing an initial resonance frequency based on the size of the upper area of each of the upward protrusions.

Referring to FIG. 6, an initial resonance frequency increases as the size of the upper area of each of the upward protrusions increases. Consequently, it can be seen that vibration resistance is relatively high although vibration is generated depending upon a load surface. On the other hand, it can be seen that, if the size of the upper area of each of the upward protrusions is greater than approximately 52 mm, the initial resonance frequency suddenly decreases. This means that deformation and stress may be changed depending upon the size of the upper area of each of the upward protrusions increases, which is an unexpected result.

On the contrary, the battery module according to the present invention is characterized in that the upper side part has a width x decided by area moment of inertia in a direction perpendicular to a direction in which the secondary batteries or the unit modules are stacked.

In a preferred example, on the assumption that the area of the baste plate is completely symmetric, and the edge of the base plate is right-angled, the width x of the upper side part may be decided within a range satisfying conditions of Equation (1) below on the basis of a width $w_{max}$ when area moment of inertia becomes the maximum with respect to the area.

$$0.5 w_{max} \leq x \leq 1.5 w_{max} \qquad (1)$$

In the above, 'when area moment of inertia becomes the maximum' means when a resistance value with respect to load of each of the unit modules becomes the greatest and when load (drooping) of the upper side part becomes the minimum.

The reason that the width x of the upper side part is decided within 50% and 150% of the width $w_{max}$ when the area moment of inertia becomes the maximum is that, if the base plate is not completely symmetric or if the edge of the base plate is filleted, the actual maximum value of the width x of the upper side part may differ from the equation.

Specifically, the width $w_{max}$ when the area moment of inertia becomes the maximum may be calculated by the following equations.

$$w_{max} = -(b_1 + b_2 + b_3)/a$$

$$a = (-(24t^3 + 36ht^2 + 12h^2 t)L - 24t^4 + 48h^2 t^2 + 24h^3 t)$$

$$b_1 = -(27t^3 + 36ht^2 + 12h^2 t)L^2$$

$$b_2 = -((12t^4 - 72ht^3 + (-84h^2 t^2) + (-24h^3 - 48dh^2)t)L$$

$$b_3 = -(-48t^5 - 72ht^4) + (-132h^2 + 48d^2 - 48dh)t^3 - (72h^3 t^2)$$

Referring to FIG. 4, in the above equations, h indicates a height of the inner side part or the outer side part, t indicates a thickness of each of the upper protrusions, and d indicates a length from the middle to the inner side part of the base plate.

As another example maximizing the width x of the upper side part, on the other hand, the width (x) of the upper side part may be equivalent to 20% to 50% of a width L from the middle to the shortest side of the base plate in a lateral direction of the base plate (0.2 L≤x≤0.5 L).

If the width x of the upper side part is too small, it may be difficult to sufficiently support the unit modules. On the other hand, if the width x of the upper side part is too large, an effect of offsetting vertical vibration decreases and it is not possible to disperse load.

In a particularly preferred example, the base plate may be further provided with one or more auxiliary protrusions connected between the upper protrusions in a lateral direction of the base plate. In a preferred example, the auxiliary protrusions may be formed at the front end and the rear end of the base plate.

This structure is advantageous in that it is possible to increase the area of the regions where the end plates are fixed, thereby effectively supporting bending load, minimizing deformation of the base plate due to vertical vibration with the result that it is possible to considerably improve overall dynamic stability of the battery module, as compared with the structure in which only the upper protrusions are formed at the base plate.

Preferably, each of the auxiliary protrusions has a width equivalent to 50 to 200% of a width of each of the upper protrusions and has a height equivalent to 40 to 100% of a height of each of the upper protrusions.

If the width and height are within the above-defined range, it is possible to further support bending load with respect to the unit modules.

More preferably, each of the auxiliary protrusions has a width equivalent to 80 to 150% of a width of each of the upper protrusions and has a height equivalent to 50 to 80% of a height of each of the upper protrusions.

According to circumstances, the edge of the base plate may be filleted to prevent stress from concentrating upon the edge of the base plate.

Consequently, the edge of the base plate is finished to have such a fillet structure, and therefore, it is possible to minimize concentration of stress upon the edge of the base plate.

Meanwhile, in a case in which the battery module is installed in a trunk of a vehicle, a spare tire or wheel housing is located at a portion of the base plate due to the layout of the vehicle. For this reason, the base plate is configured to have a structure in which the inner side part of each of the upward protrusions has a height less than that of the outer side part of each of the upward protrusions so that the shape of the base plate corresponds to that of a region of the vehicle where a trunk is mounted, thereby achieving stable installation of the battery module in the vehicle and minimizing the volume of the battery module in the vehicle.

In accordance with another aspect of the present invention, there is provided a device such as an electric vehicle, hybrid electric vehicle, or plug-in hybrid electric vehicle using the battery module with the above-stated construction as a power source, having a limited installation space, and exposed to frequent vibration and strong impact.

Of course, the battery module used as the power source of the vehicle may be combined and manufactured based on desired power and capacity.

In this case, the vehicle may be an electric vehicle, hybrid electric vehicle, or plug-in hybrid electric vehicle wherein the battery module is installed in a trunk of the vehicle.

The electric vehicle, hybrid electric vehicle, or plug-in hybrid electric vehicle using the battery module as the power source thereof are well known in the art to which the present invention pertains, and therefore, a detailed description thereof will not be given.

Advantageous Effects

As is apparent from the above description, the battery module according to the present invention is configured in a specific structure in which end plates are not deformed and have increasing resistance to stress upon application of bending load. Consequently, it is possible to stably maintain a stacked structure of unit modules each having secondary batteries mounted therein and to minimize damage to bent portions or coupling regions of the end plates.

Also, a portion of the structure of the battery module is formed using a portion of the shape of a vehicle. Consequently, the battery module is stably installed in the vehicle, and volume of the battery module in the vehicle is minimized.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 1:
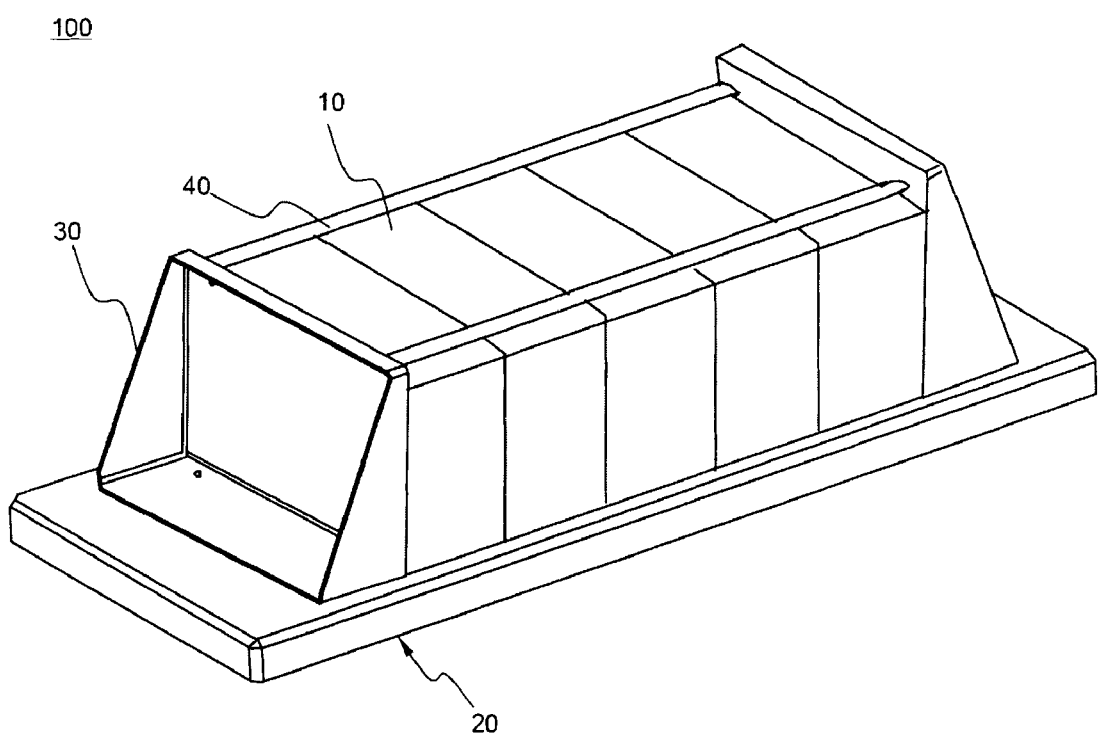
FIG. 1 is a perspective view showing a conventional battery module.
Figure 2:
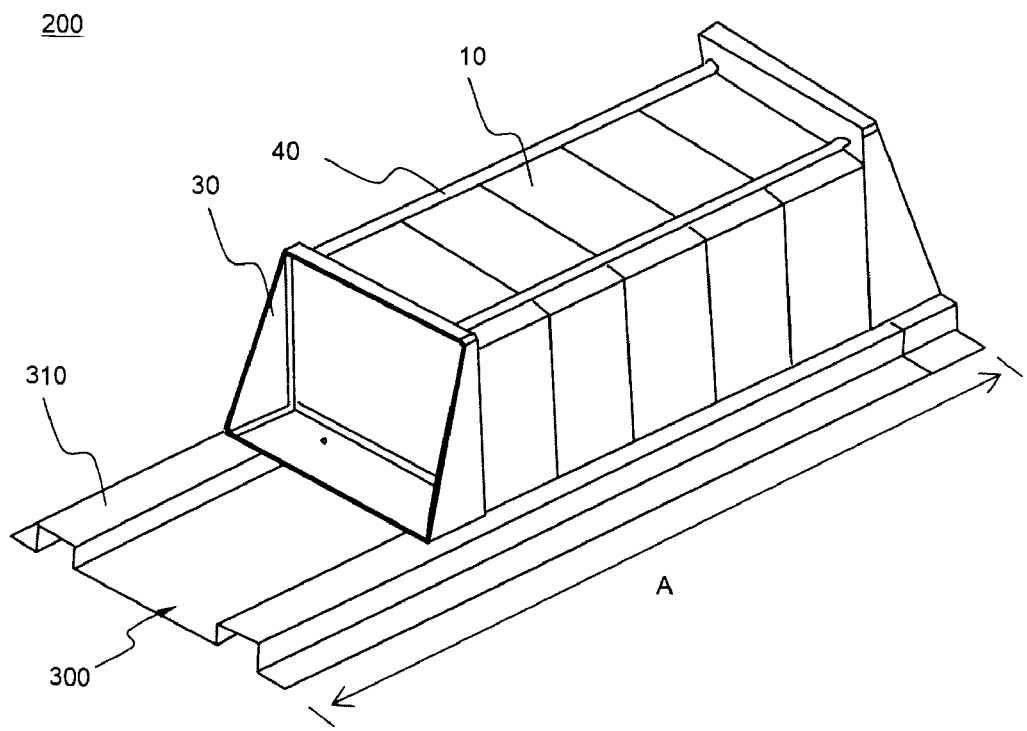
FIG. 2 is a perspective view showing a battery module according to an embodiment of the present invention.

FIG. 2 is a perspective view typically showing a battery module according to an embodiment of the present invention.

Referring to FIG. 2, the battery module 200 includes unit modules 10, each of which has secondary batteries mounted therein, a base plate 300, a pair of end plates 30, and a pair of supporting bars 40.

The unit modules 10 are stacked on the top of the base plate 300 in a state in which the unit modules 10 are erected vertically. The end plates 30 are disposed in tight contact with the outer sides of the outermost unit modules 10 in a state in which the bottoms of the end plates 30 are fixed to the base plate 200.

The supporting bars 40 are connected between the upper parts of the end plates 30 so as to support the end plates 30.

The base plate 300 is provided at opposite sides thereof with a pair of upward protrusions 310, which extends in the longitudinal direction A of the base plate 300. Opposite sides of the bottom of each of the unit modules 10 are disposed at the top of the upward protrusions 310.

Figure 3:
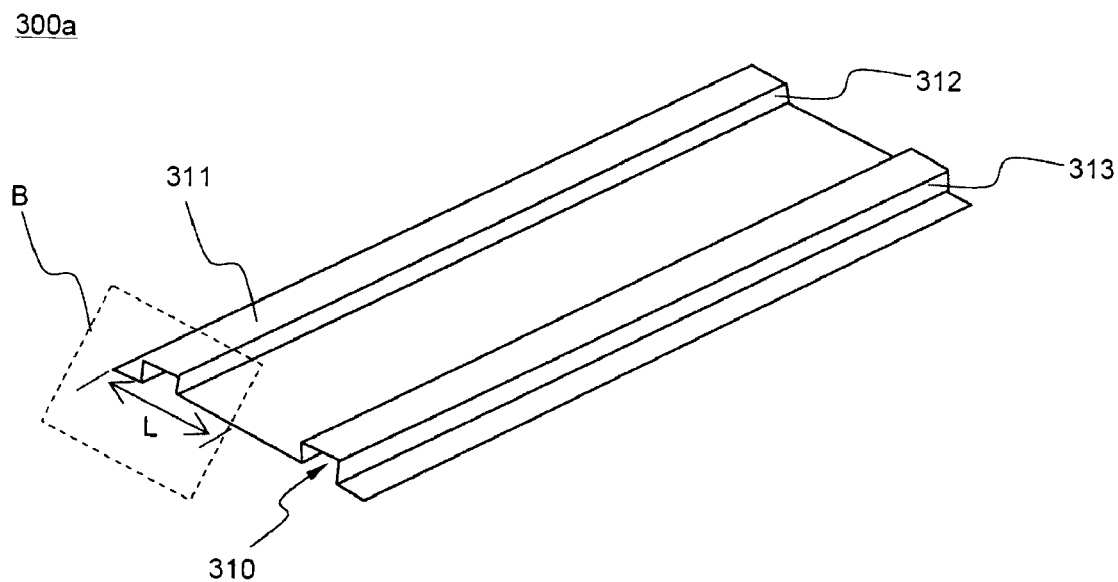
FIG. 3 is a perspective view showing a base plate of FIG. 2.
Figure 4:
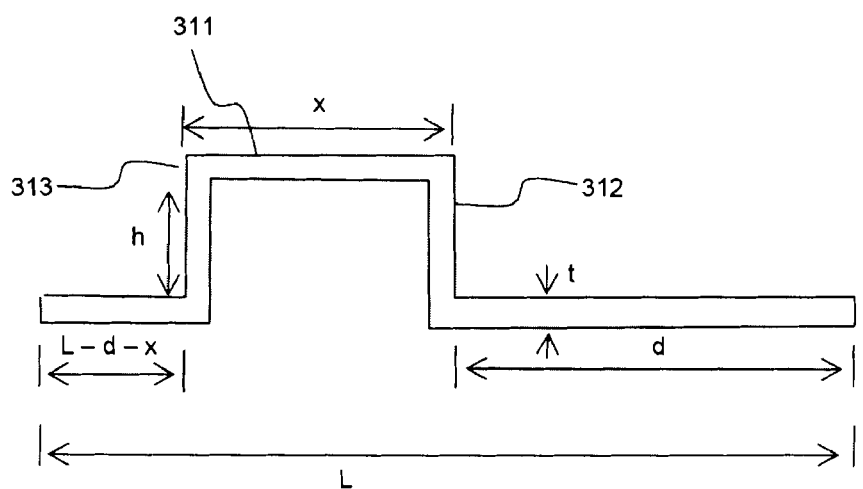
FIG. 4 is an enlarged sectional view showing region B of FIG. 3.

FIG. 3 is a perspective view typically showing the base plate of FIG. 2, and FIG. 4 is an enlarged sectional view typically showing region B of FIG. 3.

Referring to these drawing together with FIG. 2, each of the upper protrusions 310 of the base plate 300a includes a upper side part 311, with which the bottom of each of the unit modules 10 comes into contact, and an inner side part 312 and an outer side part 313 vertically connected between the upper side part 311 and a main body of the base plate 300a. This structure prevents the battery module 200 from being deformed due to vertical vibration and improves mechanical strength of the battery module 200.

The upper side part 311 of each of the upper protrusions 310 has a width x equivalent to approximately 40% of a width L from the middle to the shortest side of the base plate 300a in the lateral direction of the base plate 300a.

Figure 5:
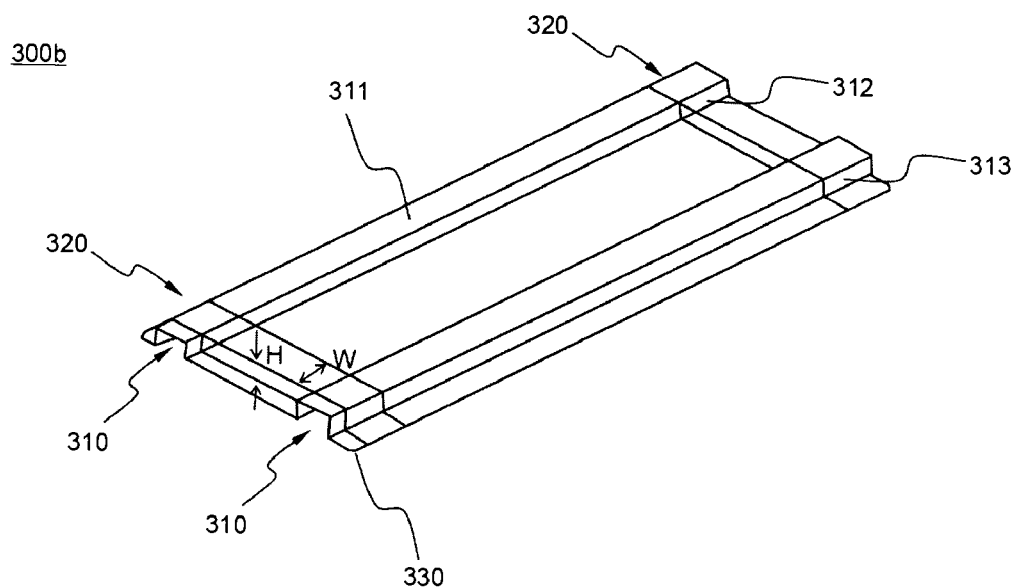
FIG. 5 is a perspective view showing a base plate according to another embodiment of the present invention.
Figure 6:
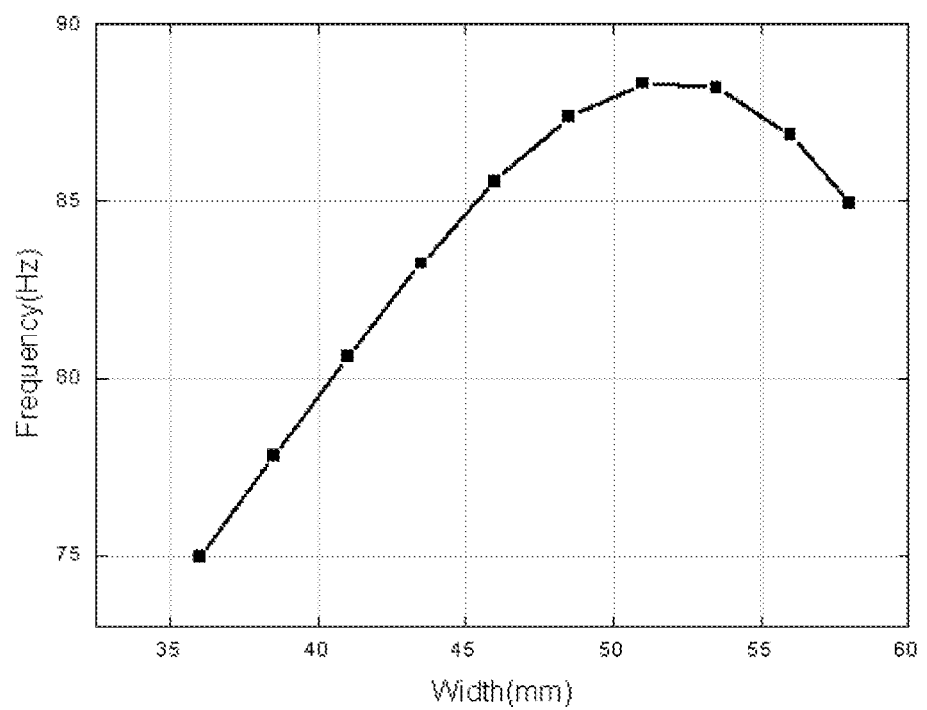
FIG. 6 is a graph showing an initial resonance frequency based on the size of the upper area of an upward protrusion.

FIG. 5 is a perspective view showing a base plate according to another embodiment of the present invention.

Referring to FIG. 5, the base plate 300b is provided at the front end and the rear end thereof with auxiliary protrusions 320 connected between the upper protrusions 310 in the lateral direction of the base plate 300b.

Each of the auxiliary protrusions 320 has a width W equivalent to approximately 120% of the width x of each of the upper protrusions 310. Also, each of the auxiliary protrusions 320 has a height H equivalent to approximately 100% of a height h of each of the upper protrusions 310.

In addition, the edge of the base plate 300b is filleted to effectively prevent stress generated from the unit modules 10 from concentrating upon the edge of the base plate 300b.

In a case in which the auxiliary protrusions 320 as well as the upper protrusions 310 are formed at the base plate 300b, therefore, it is possible to increase the area of the regions where the end plates 30 are fixed, thereby effectively supporting bending load, minimizing deformation of the base plate 300b due to vertical vibration. As a result, it is possible to considerably improve overall dynamic stability of the battery module.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A middle or large-sized battery module adapted to receive secondary batteries or unit modules comprising:
   (i) a base plate;
   (ii) unit modules, each of which has secondary batteries mounted therein;
   (iii) a pair of end plates disposed in contact with outermost unit modules; and
   (iv) a supporting bar provided between the pair of end plates, wherein the supporting bar is provided in a longitudinal direction of the pair of end plates,
   wherein the base plate comprises:
   a pair of upward protrusions extending in a longitudinal direction of the base plate at opposite sides thereof to prevent the base plate from being deformed due to vertical vibration and to disperse pressure and to receive a bottom of the secondary batteries or unit modules,
   wherein each of the upper protrusions comprises an upper side part, with which the bottom of each of the secondary batteries or the unit modules comes into contact, and an inner side part and an outer side part vertically connected between the upper side part and a main body of the base plate, and wherein each upper protrusion has an area moment of inertia in a direction perpendicular to a direction in which the secondary batteries or the unit modules are stacked,
   wherein the base plate is further provided with one or more auxiliary protrusions disposed on the upper side part of the upper protrusions and connecting the upper protrusions in a lateral direction of the base plate,
   wherein edges of the base plate are circularly filleted to prevent stress from concentrating at the edges of the base plate,
   wherein the upper side part has a width (x) corresponding to the area moment of inertia in a direction perpendicular to a direction in which the secondary batteries or the unit modules are stacked,
   wherein an inner side part of each of the upward protrusions has a height less than that of an outer side part of each of the upward protrusions,
   wherein a height of a lower plane of the auxiliary protrusions measured from a base of the upper protrusions is equivalent to a height of an upper plane of the upper protrusions measured from the base of the upper protrusions,
   wherein the auxiliary protrusions are formed at a front end and a rear end of the base plate,
   wherein the auxiliary protrusions formed at the front end and the rear end have a same structure and a same shape, and
   wherein a width of an upper area of each of the upper protrusions is equal to or greater than 50 mm and equal to or less than 55 mm.

2. The battery module according to claim 1, wherein a width (x) of the upper side part is equivalent to 20% to 50% of a width (L) from the middle to the shortest side of the base plate in a lateral direction of the base plate (0.2 L≤x≤0.5 L).

3. The battery module according to claim 1, wherein each of the auxiliary protrusions has a width equivalent to 50 to 200% of a width of each of the upper protrusions and has a height equivalent to 40 to 100% of a height of each of the upper protrusions.

4. An electric vehicle using the battery module according to claim 1 as a power source.

5. The vehicle according to claim 4, wherein the battery module is installed in a trunk of the vehicle.

* * * * *